Sept. 15, 1959 K. D. KURZ ET AL 2,904,024
VALVE ACTUATING MECHANISM FOR INTERNAL COMBUSTION ENGINES
Filed June 17, 1957
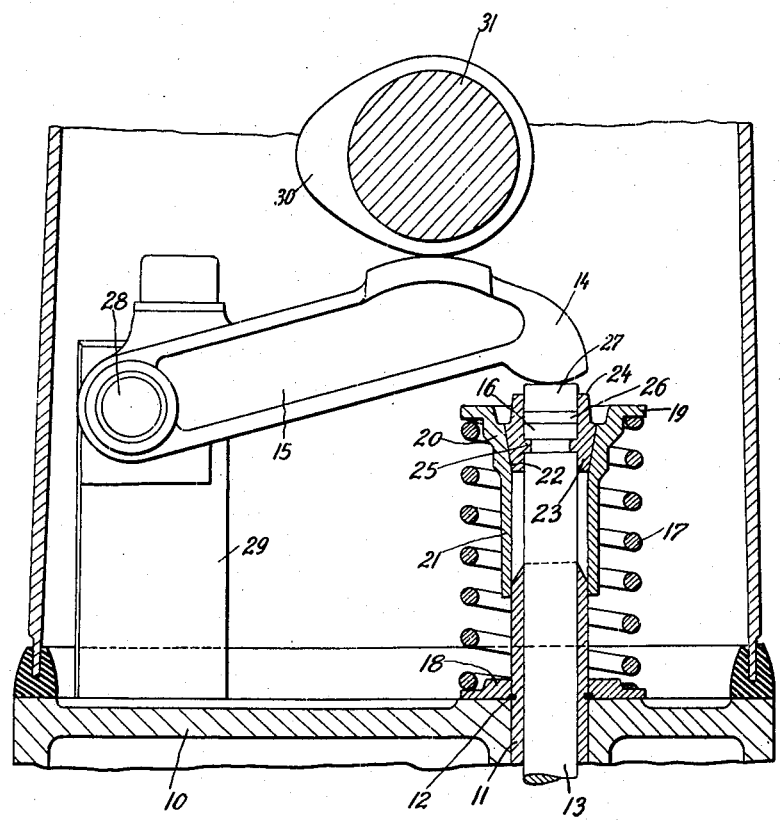
Inventors
KARL DIETRICH KURZ AND
HANS-OTTO DERNDINGER
BY Dike and Bray
ATTORNEYS.

United States Patent Office 2,904,024
Patented Sept. 15, 1959

2,904,024
VALVE ACTUATING MECHANISM FOR INTERNAL COMBUSTION ENGINES

Karl Dietrich Kurz, Stuttgart-Rohracker, and Hans-Otto Derndinger, Stuttgart, Germany, assignors to Daimler-Benz Aktiengesellschaft, Stuttgart-Unterturkheim, Germany Application June 17, 1957, Serial No. 665,945

Claims priority, application Germany June 19, 1956

4 Claims. (Cl. 123—90)

Our invention relates to a valve actuating mechanism for internal combustion engines and, more particularly, to means for adjusting the clearance thereof.

It is the object of our invention to provide an improved valve actuating mechanism in which the adjustment of the clearance may be effected by a simple exchange of a spacing member requiring but a simple manipulation and to reduce the overall height of the valve actuating mechanism to a minimum.

Further objects of our invention will appear from a detailed description of a preferred embodiment of our invention following hereinafter with reference to the accompanying drawing. We wish it to be understood, however, that our invention is in no way limited to the details of such embodiment but is capable of numerous modifications within the scope of the appended claims and that the terms and phrases used in the description following hereinafter have been chosen for the purpose of illustrating the invention rather than that of restricting or limiting the same. The accompanying drawing illustrates a partial vertical section taken through the cylinder head of an internal combustion engine equipped with our novel valve actuating mchanism.

In a vertical bore of the water-cooled cylinder head 10 of an internal combustion engine a guide sleeve 11 is inserted and fixed in position by suitable means including a split ring 12, such sleeve slidably accommodating the upright stem 13 of a poppet valve which may be an inlet valve or an outlet valve of the engine. A valve actuating member which in the embodiment shown is formed by the end 14 of a swingable arm 15 is mounted in spaced relationship above the end face 16 of the stem 13. A helical spring 17 surrounds the stem 13 and is inserted between a washer 18 mounted on a seating face of the cylinder head 10 and a peripheral flange 19 provided at the top of an annular spring support 20 having a sleeve-like lower portion 21 slidably guided on the sleeve 11. The support 20 has an internal upwardly flaring seating face 22 which surrounds the stem 13 at a suitable distance therefrom. Each of a plurality of wedge members 23 distributed around the stem 13 is inserted between the seating face 22 and the periphery of the stem and has a portion 24 projecting above the end face 16 towards the actuating member 14. Preferably, the stem 13 has a peripheral groove 25 and each wedge member 23 has an internal projection engaging the groove 25.

Under the pressure exerted by the biassed spring 17 against the spring support 20 the seating face 22 thereof will firmly wedge the members 23 against the peripheral surface of the stem 13 and into engagement with the peripheral groove 24 thereof. Hence, the wedge members 23 constitute means for fixing the spring support 20 on the stem 13, such means being interposed therebetween and projecting above the end face 16 towards the actuating member 14.

The projecting portions 24 form a nest and a spacing member is exchangeably inserted in such nest in contact with the end face 16 for engagement by the actuating member 14.

In the embodiment shown the spacing member is composed of two superimposed parts, one of said parts being a disk 26 and the other part being a cylindrical element 27 which is slidably guided between the projecting portions 24 of the wedge members.

The arm 15 is fulcrumed upon a horizontal pin 28 mounted in a bracket 29 fixed to the cylinder head 10 and a cam 30 of a horizontal cam shaft 31 is so associated with the arm 15 as to rock the same up and down.

When the parts assume the position illustrated in the drawing the poppet valve is closed, its valve head being pressed upon the associated valve seat by the pressure exerted by spring 17. When the arm 15 is depressed by the cam 30, the valve actuating member 14 will depress the valve stem 13 through the intermediary of the composite spacing member 26, 27 to open the valve.

When the same parts assume the position shown in the drawings a certain amount of lost motion or clearance must exist between the cam 30 and the swingable arm 15. This clearance must be re-adjusted from time to time since it is liable to be affected by wear of the valve and the valve seat. Such re-adjustment may be effected in a very simple manner by exchanging the spacing member or at least the portion 26 thereof for another one having the required axial thickness. For the purpose of effecting such exchange, the spring support 20 must be depressed contrary to the pressure exerted by spring 17 until one or a plurality of the wedge members 23, 24 can be removed. Upon such removal the composite spacing member 26, 27 may be readily taken off and replaced by another one having the suitable thickness. Thereafter the wedge members are inserted again and the spring support 20 is permitted to slip back in place.

From the foregoing description it will appear that our invention relates to improved means for adjusting the valve clearance or lost motion in internal combustion engines with the aid of an exchangeable inserted spacing member held on the end of the valve stem by the projections 24 of the wedge members 23. As a result, the overall height of the valve actuating mechanism will be reduced to a minimum. Such reduction, however, is highly desirable because it results in a reduction of the weight and of the cost of manufacture.

If desired, the disk 26 may be omitted. In this event a plurality of exchangeable cylindrical spacing members 27 must be kept on stock.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. In an internal combustion engine, the combination comprising a poppet valve having a stem, a valve actuating member movably mounted above the end face of said stem, a helical spring surrounding said stem, an annular spring support engaging said spring and surrounding said stem, means for fixing said support on said stem, said means being interposed between said spring support and said stem projecting above the end face of said stem towards said actuating member and forming a nest, and a cylindrical spacing member exchangeably inserted in said nest in contact with said end face for engagement by said actuating member.

2. In an internal combustion engine a combination comprising a poppet valve having a stem, a valve actuating member operatively mounted in spaced relationship above the end face of said stem, a helical spring surrounding said stem, an annular spring support abutting said spring and having an internal upwardly flaring seating surface surrounding said stem, a plurality of wedge members inserted between said seating surface and the periphery of said stem and having portions projecting above said end face towards said actuating member, and a spacing member of cylindrical shape exchangeably mounted on said end face between said portions for engagement by said actuating member.

3. The combination claimed in claim 2 in which said spacing member is comprised of two superimposed parts, one of said parts being a plain cylindrically shaped disk.

4. The combination claimed in claim 2 in which the said stem has a peripheral groove, said wedge members having internal projections engaging said groove.

References Cited in the file of this patent
UNITED STATES PATENTS

| | | |
|---|---|---|
| 1,785,596 | Petersen | Dec. 16, 1930 |
| 2,277,822 | Essl | Mar. 31, 1942 |
| 2,705,483 | Temple | Apr. 5, 1955 |
| 2,722,204 | Wente | Nov. 1, 1955 |